US012409653B2

(12) United States Patent
Kusano et al.

(10) Patent No.: US 12,409,653 B2
(45) Date of Patent: Sep. 9, 2025

(54) LIQUID EJECTION HEAD AND INKJET RECORDING APPARATUS

(71) Applicant: CANON KABUSHIKI KAISHA, Tokyo (JP)

(72) Inventors: Hiroaki Kusano, Tokyo (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 18/360,153

(22) Filed: Jul. 27, 2023

(65) Prior Publication Data

US 2024/0042763 A1 Feb. 8, 2024

(30) Foreign Application Priority Data

Aug. 8, 2022 (JP) ................................. 2022-126385

(51) Int. Cl.
*B41J 2/14* (2006.01)
*B41J 2/165* (2006.01)

(52) U.S. Cl.
CPC ......... *B41J 2/1433* (2013.01); *B41J 2/16538* (2013.01); *B41J 2/14072* (2013.01); *B41J 2002/14411* (2013.01); *B41J 2002/14443* (2013.01)

(58) Field of Classification Search
CPC .. B41J 2/1433; B41J 2/16538; B41J 2/14072; B41J 2002/14411; B41J 2002/14443
See application file for complete search history.

(56) References Cited

U.S. PATENT DOCUMENTS 6,834,937 B2 * 12/2004 Killmeier ............. B41J 2/14072 347/50
2023/0121567 A1 4/2023 Chida et al.
2024/0286408 A1 8/2024 Chida et al.

FOREIGN PATENT DOCUMENTS

JP 07-17045 A 1/1995
JP 10-44420 A 2/1998

* cited by examiner

*Primary Examiner* — Geoffrey S Mruk
(74) *Attorney, Agent, or Firm* — Venable LLP

(57) ABSTRACT

A liquid ejection head includes: a channel member; an ejection substrate being disposed in a recess of the channel member and having a nozzle row of nozzles arranged in a first direction; and a sealing member having a thermosetting resin filled in a predetermined space defined by side and bottom surfaces of the recess and a side surface of the ejection substrate and located upstream of the ejection substrate in a second direction. The sealing member includes: a first sealing portion having a first resin located near the bottom surface of the predetermined space; and a second sealing portion having a second resin located near an ejection surface of the ejection substrate. A coefficient of linear expansion of the first resin is less than that of the second resin, and a specific gravity of the first resin is greater than that of the second resin.

13 Claims, 7 Drawing Sheets

PRIOR ART

LIQUID EJECTION HEAD AND INKJET RECORDING APPARATUS

BACKGROUND OF THE INVENTION

Field of the Invention

The present invention relates to a liquid ejection head and an inkjet recording apparatus.

Description of the Related Art

An inkjet recording apparatus uses a liquid ejection head including nozzle rows each having a plurality of nozzles. FIG. 7B is a schematic cross-sectional view of a liquid ejection head 800 showing a cross section perpendicular to the nozzle arrangement direction in a nozzle row (Y direction). FIG. 7A is a schematic cross-sectional view of the liquid ejection head 800 showing a cross section perpendicular to a direction (X direction) intersecting with the nozzle arrangement direction. A channel member 802 includes a liquid channel 803 communicating with nozzles 808 of the ejection substrate 801. Ink supplied to the liquid channel 803 from an ink tank (not shown) is ejected from the nozzle 808 in the Z direction. An electric wiring member 806, which includes an external wiring for inputting an electric signal from the outside to the ejection substrate 801, is fixed to the surface of the channel member 802. The electric wiring member 806 is connected to the ejection substrate 801 by an electrical connection portion 810. The ejection substrate 801 is disposed in a recess disposed in the channel member 802, and a space 809 surrounded by the side surface and the bottom surface of the recess disposed in the channel member 802 and the side surface of the ejection substrate 801 is filled with a sealing member 804. A sealing member 811 for protecting the electrical connection portion 810 is also provided at the location where the electrical connection portion 810 is provided. Japanese Patent Application Publication No. H10-44420 describes a configuration of a liquid ejection head of an inkjet recording apparatus.

In an inkjet recording apparatus including such a liquid ejection head, paper dust generated from the recording paper during the printing process, dust floating in the air, splashes of ejected ink droplets, and the like may adhere to the ejection surface including the nozzles 808 of the ejection substrate 801. In order to remove these adherents, the inkjet recording apparatus includes a blade 807 to wipe the ejection surface. The blade 807 is made of an elastic material, such as rubber, and movable relative to the ejection surface of the ejection substrate 801. The moving direction R of the blade 807 may be a direction along the nozzle arrangement direction (Y direction) or a direction intersecting with the nozzle arrangement direction (X direction). The wiping is described in Japanese Patent Application Publication No. H07-17045.

SUMMARY OF THE INVENTION

Since the sealing member 804 is formed by filling the space 809 with a thermosetting resin and curing it at a high temperature, the cured resin shrinks when it returns to normal temperature. Also, the resin may deform to further shrink depending on the use environment, such as when the inkjet recording apparatus is placed in a low-temperature environment. Although the ejection substrate 801 also shrinks in such an environment, the difference in coefficient of linear expansion between the ejection substrate 801 and the sealing member 804 generates tensile stress in the ejection substrate 801. This stress may cause the ejection substrate 801 to crack.

As countermeasures against the above, the tensile stress acting on the ejection substrate 801 may be reduced by providing the sealing members 804 and 811 at the portion that protects the electrical connection portion 810 so that the sealing member 804 is not provided in the space 809.

In this case, foreign matter such as paper dust, dust, and splashes of ink droplets may accumulate in the space 809. This may cause foreign matter to adhere to the tip of the blade 807 when the tip of the blade 807 enters the space 809 during wiping operation. In this case, when the blade 807 passes over the ejection surface of the ejection substrate 801, foreign matter may adhere to and remain on the ejection surface, affecting the ink ejection performance.

It is an object of the present invention to limit cracking of the ejection substrate of a liquid ejection head having a configuration in which the ejection substrate is disposed in a recess of a channel member and a space between the channel member and the ejection substrate is filled with a sealing member.

According to an aspect of the present invention, a liquid ejection head includes:

- a channel member including a liquid channel;
- an ejection substrate disposed on a bottom surface of a recess disposed in the channel member, the ejection substrate including a nozzle row having a plurality of nozzles communicating with the liquid channel, the nozzles being arranged in a first direction; and
- a sealing member having a thermosetting resin filled in a predetermined space within a space defined by a side surface of the recess, the bottom surface of the recess, and a side surface of the ejection substrate, and the predetermined space being located upstream of the ejection substrate in a second direction intersecting with the first direction, wherein
- the sealing member includes:
  - a first sealing portion having a first resin located near the bottom surface within the predetermined space; and
  - a second sealing portion having a second resin located near an ejection surface of the ejection substrate within the predetermined space, the ejection surface being a surface provided with the nozzles,
- a coefficient of linear expansion of the first resin is less than a coefficient of linear expansion of the second resin, and
- a specific gravity of the first resin is greater than a specific gravity of the second resin.

According to another aspect of the present invention, a liquid ejection head includes:

- a channel member including a liquid channel;
- an ejection substrate disposed on a bottom surface of a recess disposed in the channel member, the ejection substrate including a nozzle row having a plurality of nozzles communicating with the liquid channel, the nozzles being arranged in a first direction; and
- a sealing member having a thermosetting resin filled in a predetermined space within a space defined by a side surface of the recess, the bottom surface of the recess, and a side surface of the ejection substrate, the predetermined space being located upstream of the ejection substrate in a second direction intersecting with the first direction, wherein
- the sealing member includes:

a first sealing portion having a first resin located near the bottom surface within the predetermined space; and a second sealing portion having a second resin located near an ejection surface of the ejection substrate within the predetermined space, the ejection surface being a surface provided with the nozzles, and the second sealing portion being in contact with the side surface of the ejection substrate; and a third sealing portion having a third resin located near the ejection surface of the ejection substrate within the predetermined space, the third sealing portion being in contact with the side surface of the recess, a coefficient of linear expansion of the first resin is less than a coefficient of linear expansion of the second resin and a coefficient of linear expansion of the third resin, and a specific gravity of the first resin is greater than a specific gravity of the second resin and a specific gravity of the third resin.

According to the present invention, it is possible to limit cracking of an ejection substrate of a liquid ejection head having a configuration in which the ejection substrate is disposed in a recess of a channel member and a space between the channel member and the ejection substrate is filled with a sealing member.

Further features of the present invention will become apparent from the following description of exemplary embodiments with reference to the attached drawings.

DESCRIPTION OF THE EMBODIMENTS

Figure 1:
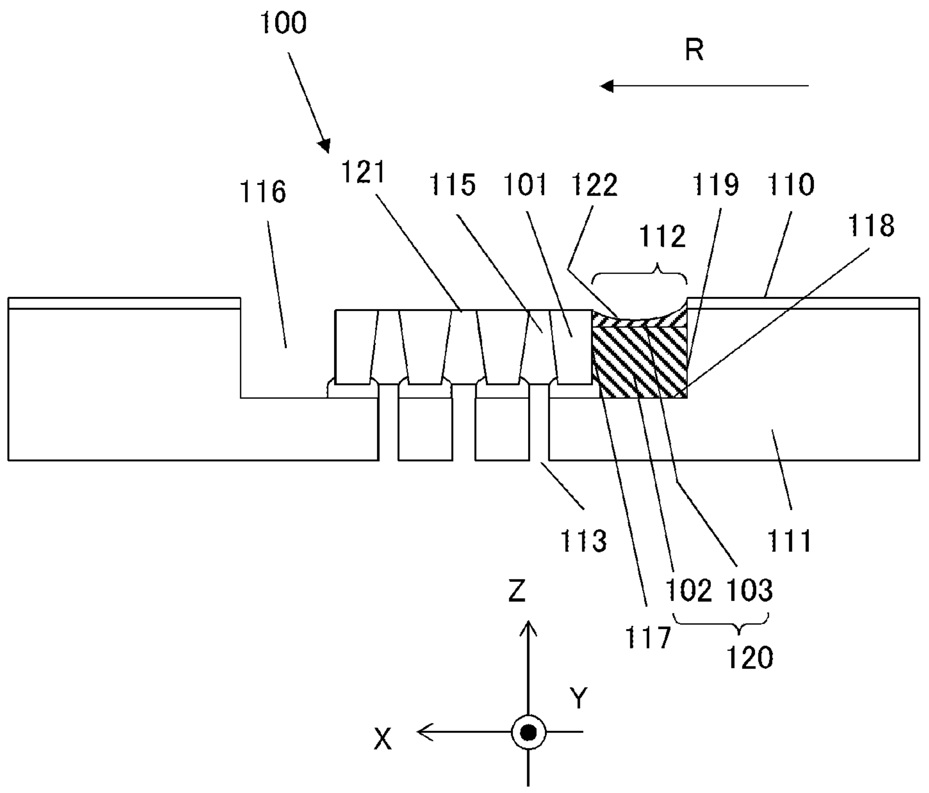
FIG. 1 is a schematic partial cross-sectional view showing the vicinity of an ejection substrate of a liquid ejection head of a first embodiment.

Referring to the drawings, embodiments of the present invention are now described.

First Embodiment

Figure 6:
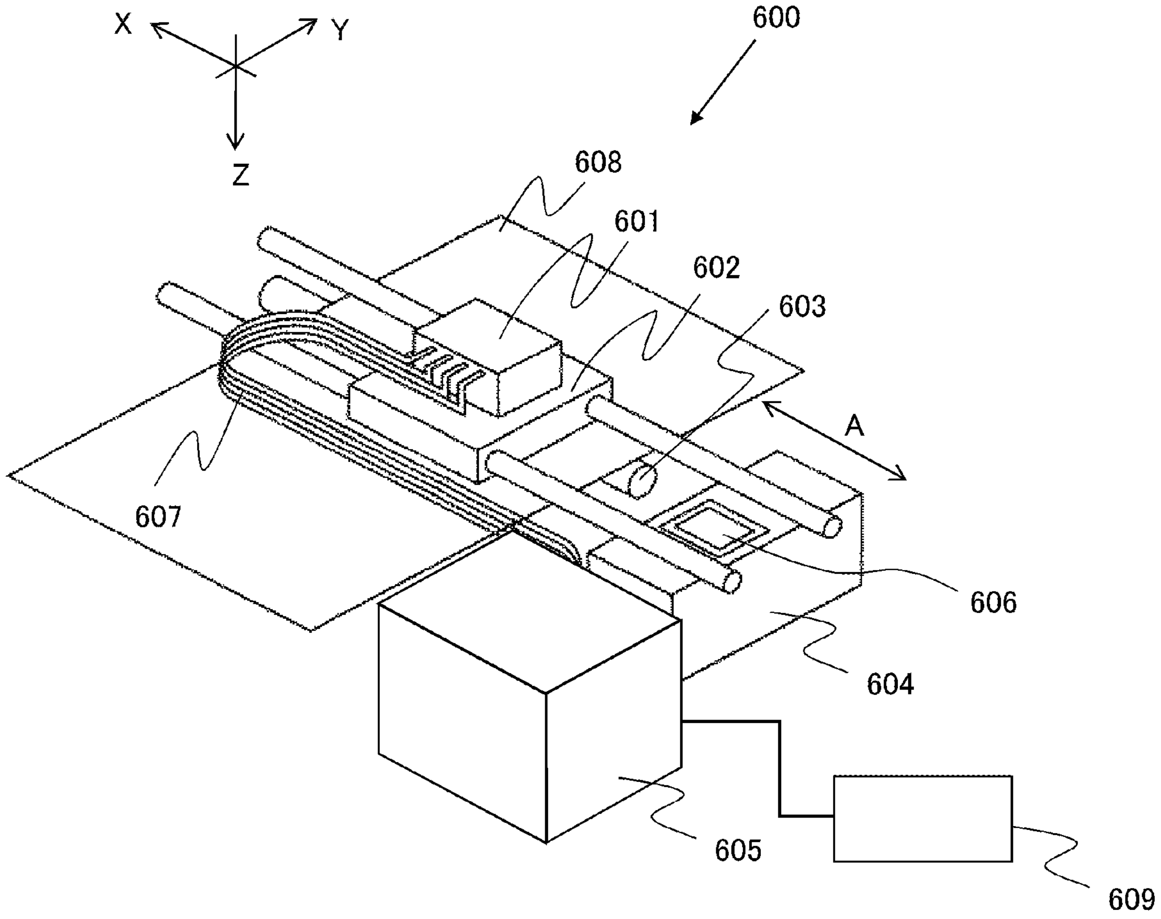
FIG. 6 is a diagram showing the schematic configuration of an inkjet recording apparatus according to an embodiment.
Figures 7A, 7B:
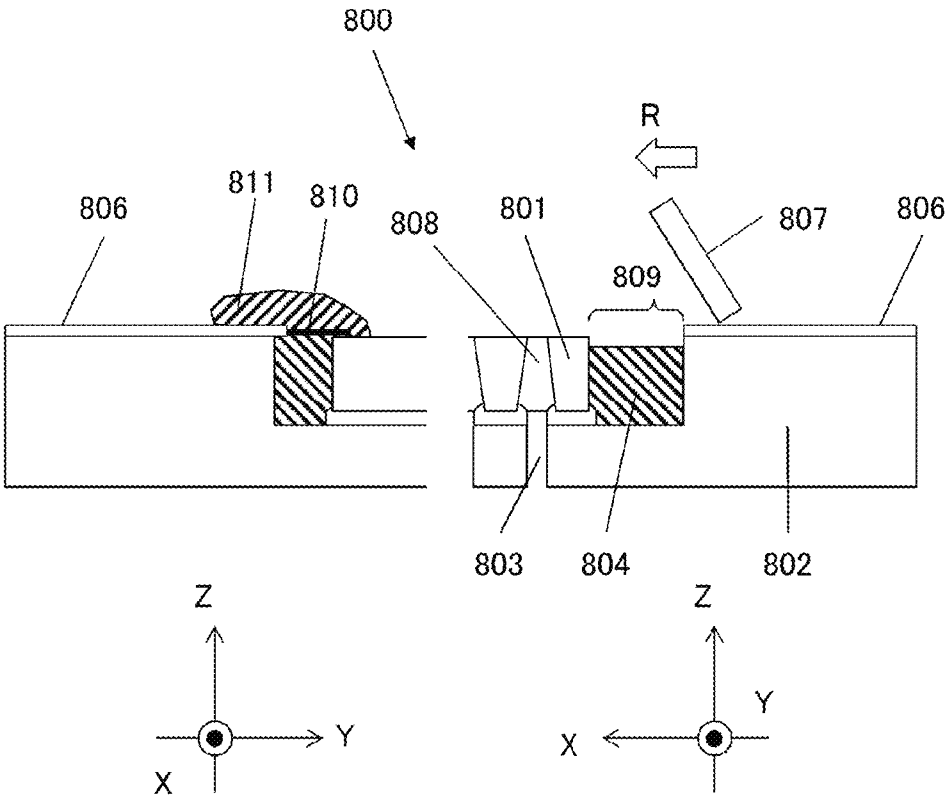
Fig.7B PRIOR ART
FIGS. 7A and 7B are schematic partial cross-sectional views showing the vicinity of an ejection substrate of a conventional liquid ejection head.

FIG. 6 is a perspective view schematically showing the configuration of an inkjet recording apparatus according to a first embodiment of the present invention. The inkjet recording apparatus 600 performs recording on a recording medium 608 by repeating reciprocating movement (main scanning) of a liquid ejection head 601 (recording head) in the X directions and transport (sub-scanning) of the recording medium 608, such as a sheet, in a Y direction at a predetermined pitch. In synchronization with these movements, the inkjet recording apparatus 600 selectively ejects liquid (pigment ink) of different colors from the liquid ejection head 601 to cause the ink to land on the recording medium 608, thereby forming characters, symbols, images, and the like on the recording medium 608. The recording medium 608 may be any medium that allows ink droplets to land thereon to form images. The recording medium 608 may be of various materials and forms, such as paper, fabric, optical disc label surface, plastic sheet, OHP sheet, and envelope.

Referring to FIG. 6, the liquid ejection head 601 is mounted on a carriage 602 in a detachable manner. The carriage 602 is slidably supported by two guide rails extending in the X direction. A driving means such as a motor (not shown) linearly reciprocates the carriage 602 in the X directions along the guide rails. A transport roller 603 serving as a transport means transports the recording medium 608 in a Y direction intersecting with the moving direction of the carriage 602 (X direction), with the recording medium 608 facing the liquid ejection surface of the liquid ejection portion of the liquid ejection head 601. The recording medium 608 thus receives the liquid ejected from the liquid ejection head 601.

The liquid ejection head 601 includes, as a plurality of liquid ejection portions, a plurality of nozzle rows for ejecting liquids of different colors (for example, yellow, magenta, and cyan inks). Liquids of different colors are independently supplied from the liquid supply unit 605 to the respective nozzle rows of the liquid ejection head 601 through respective liquid supply tubes 607.

In a non-recording region A, which is within the range of reciprocating movement of the liquid ejection head 601 in the X direction and outside the range in which the recording medium 608 passes, a recovery unit 604 is arranged to face the ink ejection surface of the liquid ejection head 601. The recovery unit 604 includes a cap portion for capping the liquid ejection surface of the liquid ejection head 601, and a suction mechanism for performing forcible suction of liquid with the liquid ejection surface capped. The recovery unit 604 also includes a wiper 606 including a cleaning blade for removing smears on the liquid ejection surface. The operation of the wiper 606 will be described below. The suction is performed by the recovery unit 604 prior to the recording operation of the inkjet recording apparatus 600. As such, even when the inkjet recording apparatus 600 is operated after being left unused for a long period of time, the recovery process performed by the recovery unit 604 removes residual bubbles in the liquid ejection portion of the liquid ejection head 601 and thickened liquid near the nozzles. This limits changes in the ejection performance of the liquid ejection head 601.

The inkjet recording apparatus 600 has a control portion 609, which controls the operation of each portion of the inkjet recording apparatus 600. The control portion 609 includes a CPU (not shown), a memory for storing programs and the like, an input/output circuit, and the like. The control portion 609 includes an input/output circuit and the like that control the reception of data, such as images to be recorded on the recording medium 608, from an external device, the operation of the motor that drives the carriage 602 and the transport roller 603, the liquid ejection operation by the liquid ejection head 601, and the operation of the wiper 606.

Figure 2A:
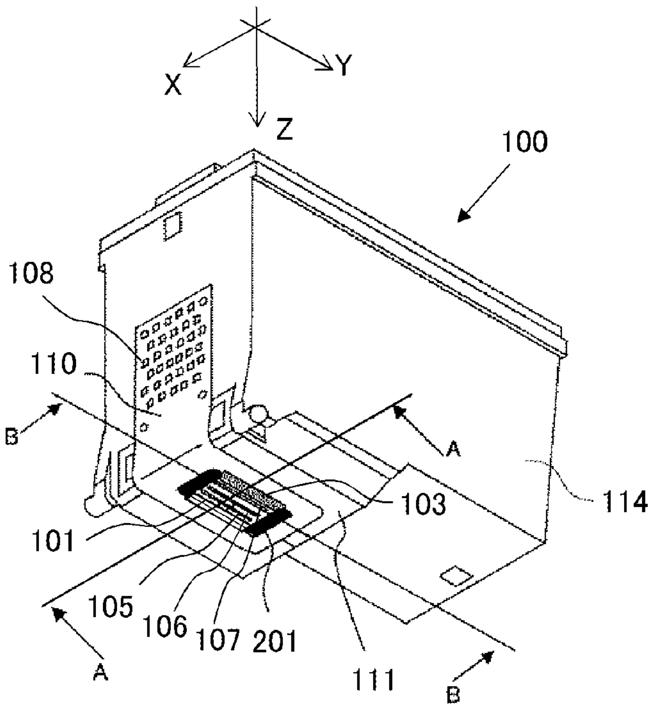
FIGS. 2A and 2B are perspective views of the liquid ejection head of the first embodiment.
Figure 2B:
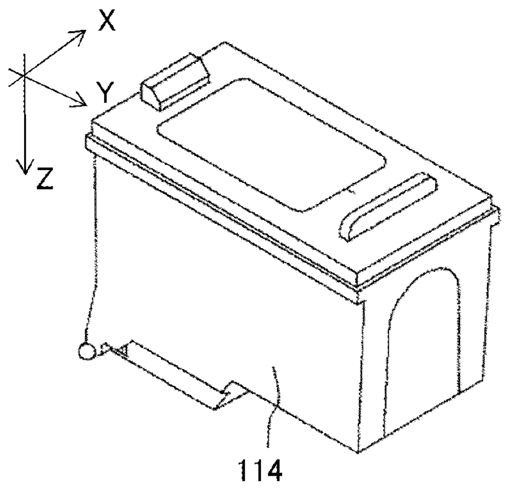

FIGS. 2A and 2B are perspective views of a liquid ejection head 100 of the first embodiment. The direction along line B-B in FIG. 2A is parallel to the arrangement direction (Y direction) of the nozzles in a nozzle row of the liquid ejection head 100, and the direction along line A-A in FIG. 2A is parallel to the direction in which nozzle rows 105, 106, and 107 of yellow, magenta, and cyan are arranged (X direction). In the first embodiment, line A-A is perpendicular to line B-B.

The liquid ejection head 100 has a configuration in which an ejection substrate 101 and an ink container portion 114 containing ink are integrated. The ejection substrate 101 has a heater, serving as an energy generating element for ejecting ink, and a substrate (element substrate) including wiring for transmitting electrical energy supplied from the inkjet recording apparatus to the heater. On the substrate, a nozzle plate (channel forming member) is provided that includes channels for supplying ink to the heater and nozzles (ejection ports) for ejecting ink.

The nozzle plate of the ejection substrate 101 includes nozzle rows 105, 106, and 107 for ejecting ink of three colors, yellow, magenta, and cyan.

The ink to be supplied to the ejection substrate 101 is contained in an ink container portion 114, which holds and stores ink of each color. Ink absorbers for holding ink and ink supply passages for supplying ink to the ejection substrate 101 are provided in the ink container portion 114. The liquid ejection head 100 has a channel member 111 for supplying ink from the ink container portion 114 to the ejection substrate 101. Ink is supplied from the ink supply passage to the nozzle rows of the ejection substrate 101 through the channel member 111. The ink supply passage has a filter for limiting entry of foreign matter into the nozzles.

The ejection substrate 101 is made of a silicon substrate and is bonded and fixed to the bottom surface of a recess disposed in the channel member 111. Within the space (gap) surrounded by the side surface of the ejection substrate 101 and the side surface and the bottom surface of the recess of the channel member 111, the space on the upstream side in the moving direction of the blade during wiping is sealed by a first sealing portion 102 and a second sealing portion 103. Note that the space on the downstream side in the blade moving direction within the above space may also be sealed by the first sealing portion 102 and the second sealing portion 103. As will be described below, in the configuration of the first embodiment, the second sealing portion 103 is placed over the first sealing portion 102 in the Z direction (ejection direction), and the second sealing portion 103 is exposed to the outside. Thus, the first sealing portion 102 is not visible in FIGS. 2A and 2B.

The liquid ejection head 100 also includes an electric wiring member 110 for transmitting electric signals from the inkjet recording apparatus to the ejection substrate 101. An electric signal is input to the ejection substrate 101 from the inkjet recording apparatus through an external signal input terminal 108. The electric wiring member 110 is fixed to the surface of the channel member 111 so as to surround the recess of the channel member 111 in which the ejection substrate 101 is disposed. The electric wiring member 110 is connected to both ends of the ejection substrate 101 in the Y direction (sides parallel to the X direction), and the connection portions are each sealed from ink and protected by a first connection sealing portion 201 and a second connection sealing portion 202. As will be described below, the first connection sealing portion 201 is placed to cover the electric wiring and the second connection sealing portion 202, so the second connection sealing portion 202 is not visible in FIGS. 2A and 2B.

Referring to FIG. 1, the configuration of the liquid ejection head 100 of the first embodiment is described in detail. FIG. 1 is a schematic partial cross-sectional view showing the vicinity of the ejection substrate of the liquid ejection head 100 of the inkjet recording apparatus according to the first embodiment of the present invention. FIG. 1 is a cross-sectional view taken perpendicular to the Y direction (the direction in which a plurality of nozzles is arranged in a nozzle row), and is a cross-sectional view taken along line A-A shown in FIG. 2A.

The ejection substrate 101 includes a silicon substrate, on which a plurality of thermoelectric conversion elements is formed, and a channel forming member (also referred to as a nozzle plate) formed on the silicon substrate. This channel forming member forms a plurality of liquid channels including liquid chambers surrounding the thermoelectric conversion elements, and a plurality of nozzles 115 communicating with the respective liquid chambers. Also, a common liquid chamber common to the multiple liquid channels is formed in the channel forming member, and ink supply ports each having an elongated rectangular opening extend through the silicon substrate to supply ink to the common liquid chamber. These components are simplified in FIG. 1. The shape of the opening of the ink supply port is elongated in a direction (Y direction) along line B-B in FIG. 2A.

In FIG. 1, the ejection substrate 101 is bonded and fixed to the channel member 111. The ejection substrate 101 includes nozzle rows each formed by a plurality of nozzles arranged in a first direction (Y direction). The ejection substrate 101 has a configuration in which a plurality of such nozzle rows is arranged in a second direction (X direction). The first direction (Y direction) intersects with the second direction (X direction), and they are perpendicular to each other in the first embodiment. The channel member 111 includes liquid channels 113 for supplying the ink stored in the ink container portion of the liquid ejection head 100 to the ejection substrate 101. The liquid channels 113 of the channel member 111 are provided so as to correspond to the positions and shapes of the ink supply ports (through holes) of the silicon substrate constituting the ejection substrate 101. The liquid channels 113 communicate with the nozzles of the ejection substrate 101. The channel member 111 is made of the same resin material as that of the ink container portion 114 of the liquid ejection head 100 by injection molding using a mold.

The channel member 111 has a recess 116 having a bottom surface to which the ejection substrate 101 is fixed. The electric wiring member 110 is bonded and fixed to the channel member 111 so as to surround the recess 116.

A space 112 (gap) surrounded by the side surface 117 of the ejection substrate 101 and the side surface 119 and the bottom surface 118 of the recess 116 of the channel member 111 is filled with a first sealing member 120. In the first embodiment, within the space 112, a predetermined space located upstream of the ejection substrate 101 in the second direction (X direction) intersecting with the first direction (Y direction) (the space on the right side in FIG. 1) is filled with the first sealing member 120. Note that the first sealing member 120 may also be provided in a space within the space 112 that is downstream of the ejection substrate 101 in the second direction (the space on the left side in FIG. 1).

In the first embodiment, the first sealing member 120 includes a first sealing portion 102 and a second sealing portion 103. The first sealing portion 102 is positioned in the bottom surface side of the space 112 (the side closer to the bottom surface 118) and made of a first resin. The second sealing portion 103 is positioned in the ejection surface side of the space 112 (the side closer to the ejection surface 121 of the ejection substrate 101 at which the nozzles 115 open) and made of a second resin. As the first resin and the second resin, thermosetting resins that are relatively easy to handle in the manufacturing process are used. The specific gravity of the first resin constituting the first sealing portion 102 is greater than the specific gravity of the second resin constituting the second sealing portion 103. As a result, the second sealing portion 103 is positioned above the first sealing portion 102 as viewed in FIG. 1.

The coefficient of linear expansion of the first resin constituting the first sealing portion 102 is less than the coefficient of linear expansion of the second resin constituting the second sealing portion 103. The thermosetting resin of the first sealing portion 102 has a small coefficient of linear expansion and thus reduces the tensile stress acting on the ejection substrate 101, which is in contact with the first sealing portion 102 at the side surface 117, when the first sealing portion 102 is cured and shrunk after being heated and then cooled. This limits cracking of the ejection substrate 101.

The surface tension of the second resin constituting the second sealing portion 103 is less than the surface tension of the first resin constituting the first sealing portion 102. Since the thermosetting resin of the second sealing portion 103 has a small surface tension, the attraction between the particles of the liquid and the wall surface is greater than the attraction in liquid, so that a concave meniscus tends to occur between the liquid surface and the wall surface. Accordingly, the surface 122 of the second sealing portion 103 has a smooth concave shape that is concave toward the bottom surface 118 in a cross section that intersects with the first direction (Y direction). In the first embodiment, the surface 122 of the second sealing portion 103 is formed to connect the upstream end (corner) in the second direction (X direction) of the ejection surface 121 of the ejection substrate 101 and the upstream end in the second direction (X direction) of the recess 116 (end of the channel member 111). The viscosity of the second resin may be less than the viscosity of the first resin. Also, the thixotropic coefficient of the second resin may be less than the thixotropic coefficient of the first resin.

Furthermore, the filling amount of the first resin constituting the first sealing portion 102 is greater than the filling amount of the second resin constituting the second sealing portion 103. As a result, the tensile stress acting on the ejection substrate 101 caused by curing shrinkage of the thermosetting resin can be reduced, thereby limiting cracking of the ejection substrate 101.

The first sealing member 120 is formed as follows. First, the first resin is applied by a dispensing method to the space 112 surrounded by the side surface 117 of the ejection substrate 101 and the bottom surface 118 and the side surface 119 of the recess 116 of the channel member 111. The shape change of the applied first resin reaches an equilibrium state after a lapse of a certain time, the surface becomes flat, and the first sealing portion 102 is formed. After the surface of the first resin becomes flat, the second sealing portion 103 is formed by applying the second resin onto the first sealing portion 102 by a dispensing method.

Figure 3:
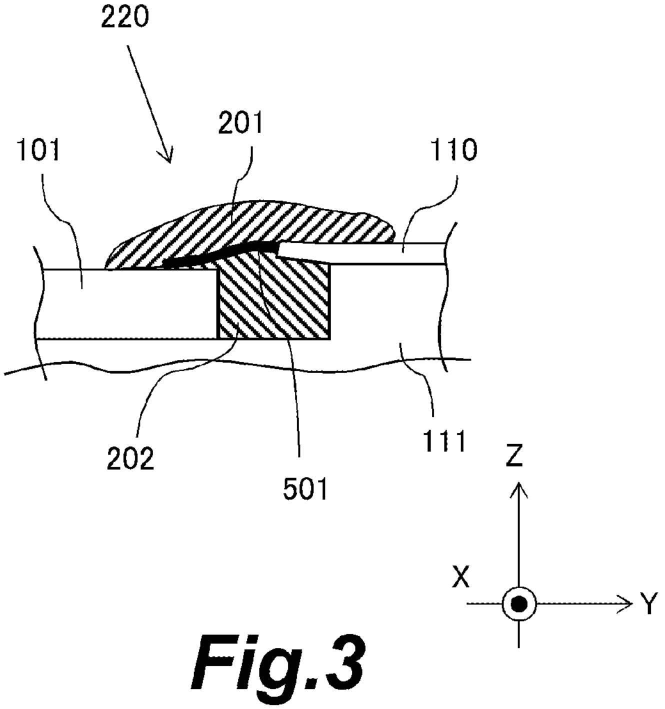
FIG. 3 is a schematic partial cross-sectional view showing the vicinity of an electrical connection portion of the ejection substrate of the liquid ejection head of the first embodiment.

FIG. 3 is a diagram showing the area around a connection portion between the ejection substrate and the electric wiring member. FIG. 3 is a cross-sectional view taken perpendicular to the X direction (the direction in which the nozzle rows are arranged), and is a cross-sectional view taken along line B-B shown in FIG. 2A.

In the first embodiment, the ejection substrate 101 is electrically connected to the electric wiring member 110 for inputting electric signals from the inkjet recording apparatus (outside). Tape automated bonding (TAB) is used for the electric wiring member 110, and a flying lead 501 of the TAB device is bonded to an electric pad (not shown) on the upper surface of the ejection substrate 101. The electric pad and the flying lead 501 form a connection portion electrically connecting the electric wiring member 110 and the ejection substrate 101.

The electric wiring member 110 is attached and fixed to the surface of the channel member 111 so as to surround the recess 116 of the channel member 111. The electric wiring member 110 and the ejection substrate 101 are connected by flying leads 501 (connection portions) at both ends of the ejection substrate 101 in the first direction (Y direction). That is, the connection portions for electrically connecting the electric wiring member 110 and the ejection substrate 101 are provided at both ends of the ejection substrate 101 in the first direction (Y direction).

The second sealing member 220 covers each connection portion between the electric wiring member 110 and the ejection substrate 101. The second sealing member 220 includes a first connection sealing portion 201, which covers the upper portion of the connection portion, and a second connection sealing portion 202, which covers the lower portion of the connection portion, and protects the connection portion from the ink. The second connection sealing portion 202, which protects the lower portion of the connection portion, is provided in the space 112 as is the first sealing portion 102. Within the space 112 surrounded by the bottom surface 118 and the side surface 119 of the recess 116 of the channel member 111 and the side surface 117 of the ejection substrate 101, the second connection sealing portion 202 is provided in a space located on the upstream side of the ejection substrate 101 in the Y direction. Additionally, within the space 112, the second connection sealing portion 202 is also provided in a space located downstream of the ejection substrate 101 in the Y direction. The configuration of the second connection sealing portion 202 may be different from that of the first sealing portion 102.

In the first embodiment, the first sealing portion 102, the second sealing portion 103, the first connection sealing portion 201, and the second connection sealing portion 202, which seal the space 112 around the ejection substrate 101, are cured in an oven at 100° C. for 1 hour or more after the application of thermosetting resins. These curing conditions for the thermosetting resins are merely an example. The conditions may be determined according to factors such as ink resistance and adhesive strength, and are not limited to the above example.

FIGS. 4A to 4D show the wiping operation of the liquid ejection head 100 described in the first embodiment.

Paper dust 401 generated from the recording paper or the like in the printing process, dust 402 floating in the air, splashes 403 of ink droplets ejected from the ejection ports, and the like adhere to and accumulate on the surfaces of the ejection substrate 101, the second sealing portion 103, and the electric wiring member 110. These deposits (adherents, foreign matter) may affect the ink ejection operation and the ejection performance. For this reason, the inkjet recording apparatus of the first embodiment includes a wiper 300, which removes the deposits by moving a blade 301 in the second direction (X direction). The blade 301 can be brought into contact with the ejection surface 121 of the ejection substrate 101, the surface 122 of the second sealing portion 103, and the surface of the electric wiring member 110. The blade 301 is made of an elastic material such as rubber. The distal end portion of the blade 301 is brought into contact with the ejection surface 121 and the like and thus deformed, thereby remaining in contact with the ejection surface 121 and the like.

The wiper 300 includes a driving device 302, which lifts and lowers the blade 301 in the Z directions and also moves the blade 301 in the X directions along a guide member 303 relative to the ejection surface 121 of the ejection substrate 101.

Figure 4A:
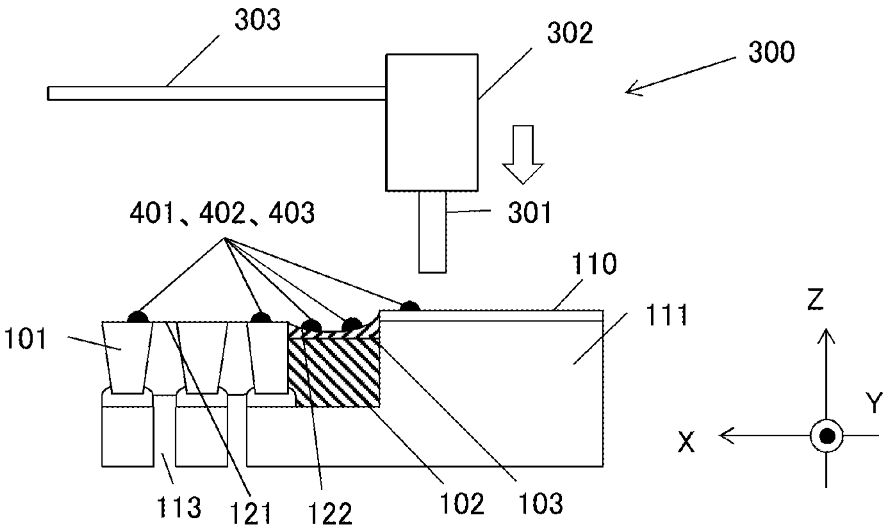
FIGS. 4A to 4D are diagrams showing a wiping operation of the ejection substrate of the liquid ejection head of the first embodiment.
Figure 4B:
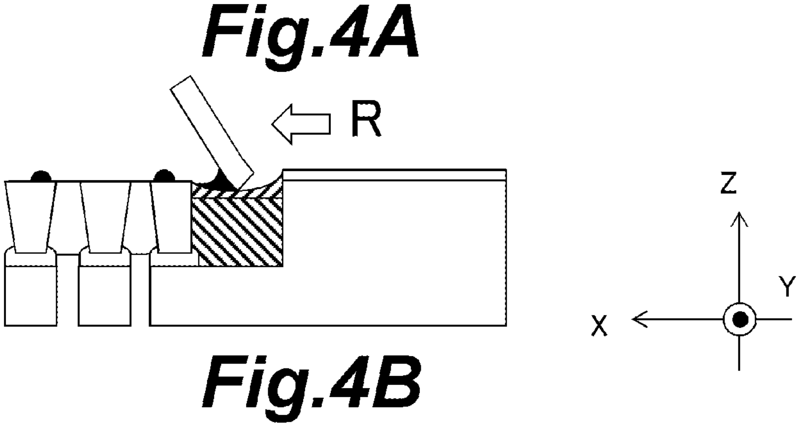
Figure 4C:
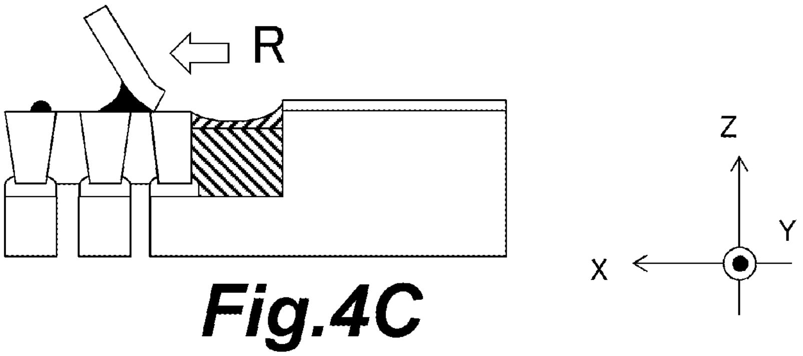
Figure 4D:
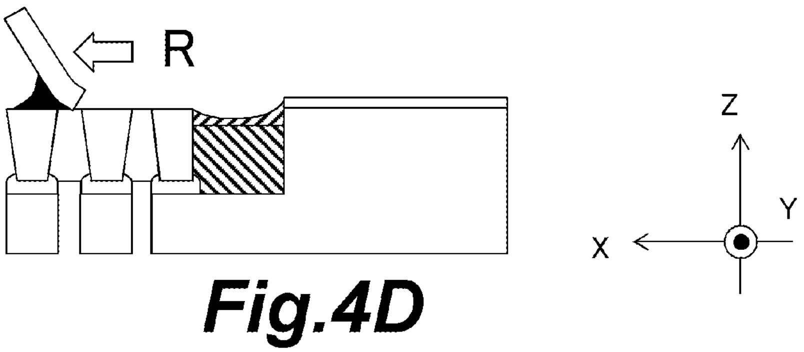

A wiping operation is performed in the following steps. First, as shown in FIG. 4A, the driving device 302 moves the blade 301 closer to the channel member 111 on the upstream side in the X direction of the space 112 filled with the first sealing member 120, and brings the blade 301 into contact with the surface of the electric wiring member 110. As shown in FIGS. 4B and 4C, the driving device 302 then moves the blade 301 in the X direction toward the ejection substrate 101. Arrow R indicates the moving direction. In the first embodiment, the moving direction R of the blade 301 is parallel to the positive X direction. From a position on the electric wiring member 110 that is located upstream in the second direction (X direction, the moving direction R of the blade 301) of the space 112 filled with the first sealing member 120, the blade 301 passes over the surface 122 of the second sealing portion 103 and then passes over the ejection surface 121 of the ejection substrate 101.

The electric wiring member 110 and the ejection surface 121 of the ejection substrate 101 are connected by the surface 122 of the second sealing portion 103 having a smooth concave shape. Accordingly, during wiping operation, the distal end portion of the blade 301 moves in the X direction while maintaining contact with the surface of the electric wiring member 110, the surface 122 of the second sealing portion 103, and the ejection surface 121 of the ejection substrate 101. As a result, as the blade 301 moves, adherents such as paper dust 401, dust 402, and ink droplets 403 can be removed from the surface of the electric wiring member 110, the surface 122 of the second sealing portion 103, and the ejection surface 121 of the ejection substrate 101.

In the first embodiment, since the space 112 (see FIG. 1) is filled with the first sealing member 120, paper dust 401, dust 402, ink droplets 403 and the like do not accumulate in this space 112. As such, paper dust, dust, or ink droplets do not accumulate in the space, adhere to the distal end portion of the blade 301, or remain on the ejection substrate 101 after being moved by the blade 301.

As described above, the liquid ejection head 100 of the first embodiment limits cracking of the ejection substrate 101 and also reduces the possibility of the ejection performance being affected by foreign matter caused by wiping operation.

Second Embodiment

Figure 5A:
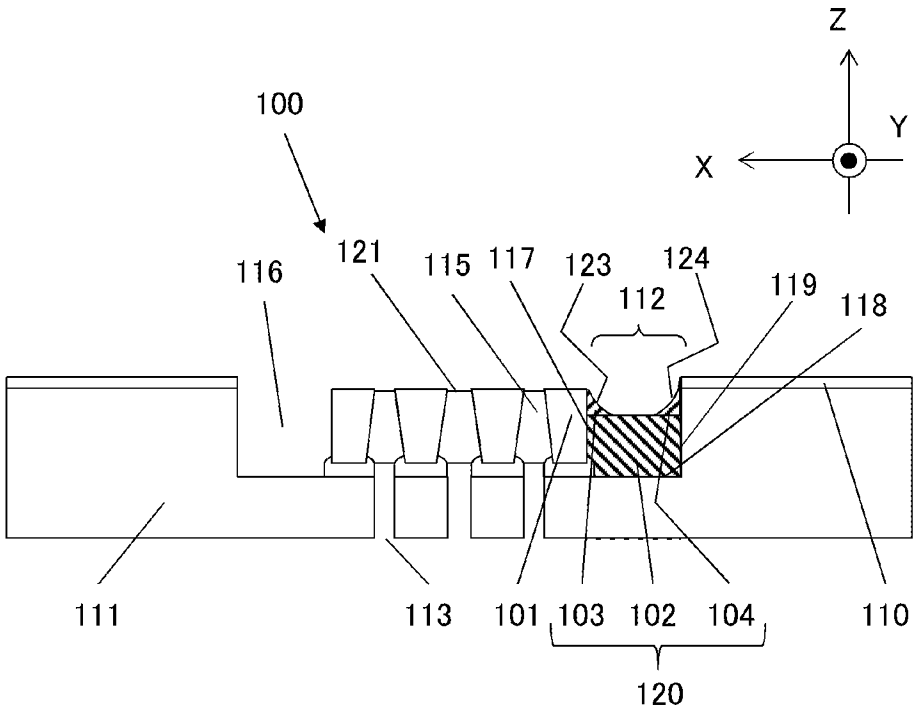
FIGS. 5A and 5B are a schematic partial cross-sectional view and a plan view showing the vicinity of an ejection substrate of a liquid ejection head of a second embodiment.
Figure 5B:
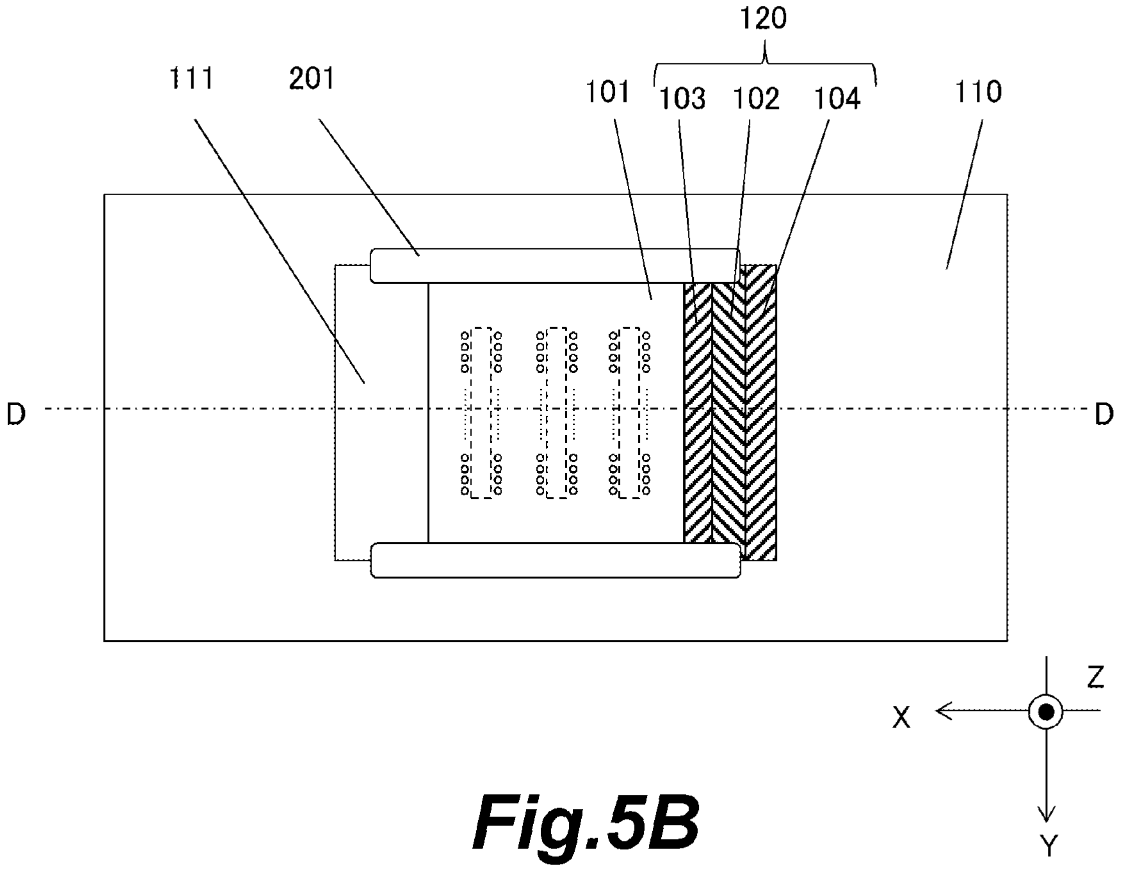

A second embodiment of the present invention is now described. FIG. 5A is a schematic partial cross-sectional view showing the vicinity of an ejection substrate of a liquid ejection head 100 of an inkjet recording apparatus according to the second embodiment. FIG. 5A is a cross-sectional view taken perpendicular to the Y direction (the direction in which a plurality of nozzles is arranged in a nozzle row), and is a cross-sectional view taken along line D-D shown in FIG. 5B. FIG. 5B is a plan view showing the vicinity of the ejection substrate of the liquid ejection head 100 of the inkjet recording apparatus according to the second embodiment. FIG. 5B is a diagram of the liquid ejection head 100 as viewed in the −Z direction. Hereinafter, same reference numerals are given to those components that are the same as those of the first embodiment. The descriptions of such components are omitted as appropriate.

Referring to FIGS. 5A and 5B, the liquid ejection head 100 of the second embodiment differs from the first embodiment in the configuration of the first sealing member 120 filling the predetermined space 112. Specifically, the first sealing member 120 of the second embodiment includes a first sealing portion 102, a second sealing portion 103, and a third sealing portion 104. As in the first embodiment, the first sealing portion 102 is positioned in the bottom surface side of the space 112 (the side closer to the bottom surface 118) and made of a first resin. The second sealing portion 103 is positioned in the ejection surface side (the side closer to the ejection surface 121) of the space 112, in contact with the side surface 117 of the ejection substrate 101, and made of a second resin. The third sealing portion 104 is positioned in the ejection surface side (the side closer to the ejection surface 121) of the space 112, in contact with the side surface 119 of the recess 116, and made of a third resin. The second resin and the third resin may be the same thermosetting resin or different thermosetting resins. The specific gravity of the first resin constituting the first sealing portion 102 is greater than the specific gravity of the second resin constituting the second sealing portion 103 and the specific gravity of the third resin constituting the third sealing portion 104. As a result, the second sealing portion 103 and the third sealing portion 104 are located above the first sealing portion 102 as viewed in FIG. 5A.

The coefficient of linear expansion of the first resin constituting the first sealing portion 102 is less than the coefficient of linear expansion of the second resin constituting the second sealing portion 103 and the coefficient of linear expansion of the third resin constituting the third sealing portion 104. The thermosetting resin of the first sealing portion 102 has a small coefficient of linear expansion and thus reduces the tensile stress acting on the ejection substrate 101, which is in contact with the first sealing portion 102 at the side surface 117, when the first sealing portion 102 is cured and shrunk after being heated and then cooled. This limits cracking of the ejection substrate 101.

Furthermore, the filling amount of the first resin constituting the first sealing portion 102 is greater than the filling amount of the second resin constituting the second sealing portion 103 and the filling amount of the third resin constituting the third sealing portion 104. As a result, the tensile stress acting on the ejection substrate 101 caused by curing shrinkage of the thermosetting resin can be reduced, thereby limiting cracking of the ejection substrate 101.

The surface tension of the second resin constituting the second sealing portion 103 and the surface tension of the third resin constituting the third sealing portion 104 are less than the surface tension of the first resin constituting the first sealing portion 102. The viscosity of the second resin and the viscosity of the third resin may be less than the viscosity of the first resin. Also, the thixotropic coefficient of the second resin and the thixotropic coefficient of the third resin may be less than the thixotropic coefficient of the first resin.

The second sealing portion 103 has a first inclined surface 123 inclined toward the first sealing portion 102 from the upstream end in the second direction (X direction) of the ejection surface 121 of the ejection substrate 101. Since the surface tension of the second resin is small, the first inclined surface 123 is a gentle slope of a concave shape toward the first sealing portion 102.

The third sealing portion 104 has a second inclined surface 124 inclined toward the first sealing portion 102 from the upstream end in the second direction (X direction) of the recess 116 of the channel member 111. Since the surface tension of the third resin is small, the second inclined surface 24 is a gentle slope of a concave shape toward the first sealing portion 102.

The upstream end in the second direction (X direction) of the second sealing portion 103 is located downstream in the second direction (X direction) of the downstream end in the second direction (X direction) of the third sealing portion 104. That is, the upstream end in the second direction (X direction) of the second sealing portion 103 is separated from the downstream end in the second direction (X direction) of the third sealing portion 104. The second sealing portion 103 and the third sealing portion 104 are not connected. As a result, a part of the first sealing portion 102 is exposed to and thus visible from the outside between the upstream end in the second direction (X direction) of the second sealing portion 103 and the downstream end in the second direction (X direction) of the third sealing portion 104.

When the channel member 111 has a large coefficient of linear expansion, tensile stress acts on the third sealing portion 104 when the channel member 111 shrinks due to an environmental change or the like. Since the second sealing portion 103 and the third sealing portion 104 are not connected, it is unlikely that the tensile stress of the third sealing portion 104 acts on the ejection substrate 101 through the second sealing portion 103. As such, the tensile stress generated in the ejection substrate 101 due to the shrinkage of the channel member 111 is reduced, thereby limiting cracking of the ejection substrate 101.

Also, the shapes of the second sealing portion 103 and the third sealing portion 104 allow the blade 301 of the wiper 300 to pass through the region of the first sealing member 120 not receiving a large resistance. As a result, the wiper 300 can desirably remove the foreign matter adhering to the surface of the first sealing member 120.

As described above, the liquid ejection head 100 of the second embodiment limits cracking of the ejection substrate 101 in a further reliable manner and also reduces the possibility of the ejection performance being affected by foreign matter caused by wiping operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-126385, filed on Aug. 8, 2022, which is hereby incorporated by reference herein in its entirety.

What is claimed is:

1. A liquid ejection head comprising:

a channel member including a liquid channel;

an ejection substrate disposed on a bottom surface of a recess disposed in the channel member, the ejection substrate including a nozzle row having a plurality of nozzles communicating with the liquid channel, the nozzles being arranged in a first direction; and a sealing member having a thermosetting resin filled in a predetermined space within a space defined by a side surface of the recess, the bottom surface of the recess, and a side surface of the ejection substrate, and the predetermined space being located upstream of the ejection substrate with respect to a second direction intersecting with the first direction, wherein the sealing member includes:

a first sealing portion having a first resin located near the bottom surface within the predetermined space; and a second sealing portion having a second resin located near an ejection surface of the ejection substrate within the predetermined space, the ejection surface being a surface provided with the nozzles, a coefficient of linear expansion of the first resin is less than a coefficient of linear expansion of the second resin, and a specific gravity of the first resin is greater than a specific gravity of the second resin.

2. The liquid ejection head according to claim 1, wherein a surface of the second sealing portion has a concave shape that is concave toward the bottom surface in a cross section intersecting with the first direction.

3. The liquid ejection head according to claim 1, wherein a surface of the second sealing portion is formed so as to connect an upstream end of the ejection surface with respect to the second direction and an upstream end of the recess with respect to the second direction.

4. The liquid ejection head according to claim 1, wherein a surface tension of the second resin is less than a surface tension of the first resin.

5. The liquid ejection head according to claim 1, wherein a filling amount of the first resin constituting the first sealing portion is greater than a filling amount of the second resin constituting the second sealing portion.

6. The liquid ejection head according to claim 1, wherein the sealing member is a first sealing member, the liquid ejection head further comprises:

an electric wiring member configured to input an electric signal from an outside to the ejection substrate;

a connection portion electrically connecting the electric wiring member and the ejection substrate; and a second sealing member covering the connection portion, the electric wiring member is fixed to a surface of the channel member so as to surround the recess, and the connection portion connects an end of the ejection substrate in the first direction and the electric wiring member.

7. An inkjet recording apparatus comprising:

the liquid ejection head according to claim 1; and a wiper configured to wipe the ejection surface with a blade that can be brought into contact with the ejection surface, wherein the wiper is configured to move the blade relative to the ejection surface in the second direction such that the blade moves from a position on the channel member upstream of the predetermined space with respect to the second direction, passes over the first sealing portion, and then passes over the ejection surface.

8. A liquid ejection head comprising:

a channel member including a liquid channel;

an ejection substrate disposed on a bottom surface of a recess disposed in the channel member, the ejection substrate including a nozzle row having a plurality of nozzles communicating with the liquid channel, the nozzles being arranged in a first direction; and a sealing member having a thermosetting resin filled in a predetermined space within a space defined by a side surface of the recess, the bottom surface of the recess, and a side surface of the ejection substrate, the predetermined space being located upstream of the ejection substrate with respect to a second direction intersecting with the first direction, wherein the sealing member includes:

a first sealing portion having a first resin located near the bottom surface within the predetermined space;

a second sealing portion having a second resin located near an ejection surface of the ejection substrate within the predetermined space, the ejection surface being a surface provided with the nozzles, and the second sealing portion being in contact with the side surface of the ejection substrate; and a third sealing portion having a third resin located near the ejection surface of the ejection substrate within the predetermined space, the third sealing portion being in contact with the side surface of the recess, a coefficient of linear expansion of the first resin is less than a coefficient of linear expansion of the second resin and a coefficient of linear expansion of the third resin, and a specific gravity of the first resin is greater than a specific gravity of the second resin and a specific gravity of the third resin.

9. The liquid ejection head according to claim 8, wherein the second sealing portion includes a first inclined surface inclined toward the first sealing portion from an upstream end of the ejection surface with respect to the second direction, and the third sealing portion includes a second inclined surface inclined toward the first sealing portion from an upstream end of the recess with respect to the second direction.

10. The liquid ejection head according to claim 8, wherein an upstream end of the second sealing portion with respect to the second direction is located downstream in the second direction of a downstream end of the third sealing portion with respect to the second direction, and a part of the first sealing portion is exposed between the upstream end of the second sealing portion and the downstream end of the third sealing portion.

11. The liquid ejection head according to claim 8, wherein surface tensions of the second resin and the third resin are less than a surface tension of the first resin.

12. The liquid ejection head according to claim 8, wherein a filling amount of the first resin constituting the first sealing portion is greater than a filling amount of the second resin constituting the second sealing portion and a filling amount of the third resin constituting the third sealing portion.

13. The liquid ejection head according to claim 8, wherein the sealing member is a first sealing member, the liquid ejection head further comprises:

an electric wiring member configured to input an electric signal from an outside to the ejection substrate;

a connection portion electrically connecting the electric wiring member and the ejection substrate; and a second sealing member covering the connection portion, the electric wiring member is fixed to a surface of the channel member so as to surround the recess, and the connection portion connects an end of the ejection substrate in the first direction and the electric wiring member.

* * * * *